(12) United States Patent
Araki et al.

(10) Patent No.: US 11,036,676 B2
(45) Date of Patent: Jun. 15, 2021

(54) MODIFYING STORAGE SPACE CONSUMED BY SNAPSHOTS

(71) Applicant: International Business Machines Corporation, Armonk, NY (US)

(72) Inventors: Hiroshi Araki, Yokohama (JP); Shah Mohammad R. Islam, Tucson, AZ (US); Hiroyuki Miyoshi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 15/060,894

(22) Filed: Mar. 4, 2016

(65) Prior Publication Data

US 2017/0255638 A1    Sep. 7, 2017

(51) Int. Cl.
*G06F 16/00* (2019.01)
*G06F 16/11* (2019.01)
*G06F 16/13* (2019.01)
*G06F 16/178* (2019.01)
*G06F 16/17* (2019.01)

(52) U.S. Cl.
CPC ............ *G06F 16/128* (2019.01); *G06F 16/13* (2019.01); *G06F 16/178* (2019.01); *G06F 16/1727* (2019.01)

(58) Field of Classification Search
CPC ......... G06F 17/30088; G06F 17/30091; G06F 17/30138; G06F 17/30174; G06F 16/128; G06F 16/1727; G06F 16/178; G06F 16/13
See application file for complete search history.

(56) References Cited

U.S. PATENT DOCUMENTS

| | | | | |
|---|---|---|---|---|
| 7,072,910 B2 * | 7/2006 | Kahn | ................ | G06F 17/3015 |
| | | | | 707/639 |
| 7,373,364 B1 * | 5/2008 | Chapman | ............ | G06F 11/1451 |
| 8,027,958 B1 * | 9/2011 | Chapman | ............ | G06F 11/1451 |
| | | | | 707/639 |

(Continued)

OTHER PUBLICATIONS

Wu et al., "TotalCOW: Unleash the Power of Copy-On-Write for Thin-provisioned Containers", APSys '15, Jul. 27-28, 2015, Tokyo, Japan, Copyright © 2015 ACM, 7 pages, <http://dx.doi.org/10.1145/2797022.2797024>.

*Primary Examiner* — Hung Q Pham
(74) *Attorney, Agent, or Firm* — Monchai Chuaychoo; Nicholas L. Cadmus

(57) ABSTRACT

The method includes identifying, by one or more computer processors, a live file. The method further includes identifying, by one or more computer processors, a snapshot that corresponds to the live file. The method further includes amending, by one or more computer processors, data corresponding to the identified live file to include tracking data for the identified snapshot. The method further includes amending, by one or more computer processors, data corresponding to the identified snapshot of the live file to include tracking data for the identified live file. The method further includes determining, by one or more computer processors, a difference in the data between the identified live file and the identified snapshot. The method further includes amending, by one or more computer processors, the identified snapshot to include only the determined difference in data between the identified live file and the identified snapshot.

17 Claims, 5 Drawing Sheets

(56) References Cited

U.S. PATENT DOCUMENTS

| | | | |
|---|---|---|---|
| 8,417,987 B1* | 4/2013 | Goel | G06F 11/1076 714/6.1 |
| 8,452,929 B2* | 5/2013 | Bennett | G06F 11/1441 711/156 |
| 8,751,523 B2* | 6/2014 | Brady | G06F 17/30088 707/639 |
| 8,806,154 B1 | 8/2014 | Gupta et al. | |
| 9,020,903 B1* | 4/2015 | Vempati | G06F 12/121 707/674 |
| 9,201,887 B1* | 12/2015 | Earl | G06F 16/128 |
| 9,251,198 B2* | 2/2016 | Mutalik | G06F 17/30162 |
| 9,898,369 B1* | 2/2018 | Moghe | G06F 11/1451 |
| 10,042,710 B2* | 8/2018 | Mutalik | G06F 11/1456 |
| 2004/0210608 A1* | 10/2004 | Lee | G06F 11/1451 |
| 2005/0086241 A1* | 4/2005 | Ram | G06F 11/1453 |
| 2005/0204147 A1* | 9/2005 | Yamasaki | G06F 21/31 713/183 |
| 2008/0126773 A1* | 5/2008 | Martinez | G06F 21/57 713/1 |
| 2008/0256399 A1 | 10/2008 | Erdosi et al. | |
| 2009/0150599 A1* | 6/2009 | Bennett | G06F 11/1441 711/103 |
| 2010/0211547 A1* | 8/2010 | Kamei | G06F 11/1451 707/649 |
| 2010/0312783 A1* | 12/2010 | Brady | G06F 17/30088 707/769 |
| 2011/0161381 A1* | 6/2011 | Wang | G06F 17/30088 707/814 |
| 2012/0017060 A1* | 1/2012 | Kapanipathi | G06F 3/0608 711/162 |
| 2012/0254122 A1 | 10/2012 | Benhase et al. | |
| 2013/0054530 A1* | 2/2013 | Baker | G06F 16/119 707/639 |
| 2013/0086007 A1 | 4/2013 | Bandopadhyay | |
| 2014/0025641 A1 | 1/2014 | Kumarasamy et al. | |
| 2014/0181579 A1* | 6/2014 | Whitehead | G06F 17/30289 714/15 |
| 2015/0312340 A1* | 10/2015 | Zhou | H04L 67/1095 709/217 |
| 2016/0335278 A1* | 11/2016 | Tabaaloute | G06F 16/184 |

* cited by examiner

Snapshot area
Data system number    file name    (Pre-data system number, Next-data system number)
1001    fileA    (NULL, 2001)

Live data system area
Data system number    file name    (Pre-data system number, Next-data system number)
2001    fileA    (1001, NULL)

FIG. 5A

Snapshot area
Data system number    file name    (Pre-data system number, Next-data system number)
1001    fileA    (NULL, 3001)

Live data system area
Data system number    file name    (Pre-data system number, Next-data system number)
3001    fileA    (1001, NULL)

FIG. 5B

Snapshot area
Data system number    file name    (Pre-data system number, Next-data system number)
1001    fileA (snap 1)    (NULL, 2001)
2001    fileA (snap 2)    (1001, NULL)

Live data system area
Data system number    file name    (Pre-data system number, Next-data system number)
2001    fileA    (1001, NULL)

FIG. 5C

Snapshot area
Data system number    file name    (Pre-data system number, Next-data system number)
1001    fileA (snap 1)    (NULL, 2001)
2001    fileA (snap 2)    (1001, 4001)

Live data system area
Data system number    file name    (Pre-data system number, Next-data system number)
4001    fileA    (2001, NULL)

FIG. 5D

MODIFYING STORAGE SPACE CONSUMED BY SNAPSHOTS

BACKGROUND OF THE INVENTION

The present invention relates generally to snapshots, and more particularly to decreasing the storage consumption of the snapshot meta area.

A snapshot is a quick backup of data at a certain point of time. The snapshot does not copy the entirety of the data. The snapshot only saves incremental data and manages pointers to live data. A copy-on-write algorithm occurs when there is a write request to a file. Before over-writing the data on the live file, a program reads the file data and copies the data to the snapshot meta area. Then, the program over-writes the data on the live file. When a user issues a read request of a snapshot file, a file system/storage product will read the snapshot metadata stored in the snapshot meta area, read the data in the live file, and merge the two to create a file image at the time of snapshot creation, which is presented to the user.

SUMMARY

Aspects of the present invention disclose a method, computer program product, and system for reducing the storage space consumed by snapshots. The method includes identifying, by one or more computer processors, a live file. The method further includes identifying, by one or more computer processors, a snapshot that corresponds to the live file. The method further includes amending, by one or more computer processors, data corresponding to the identified live file to include tracking data for the identified snapshot. The method further includes amending, by one or more computer processors, data corresponding to the identified snapshot of the live file to include tracking data for the identified live file. The method further includes determining, by one or more computer processors, a difference in the data between the identified live file and the identified snapshot. The method further includes amending, by one or more computer processors, the identified snapshot to include only the determined difference in data between the identified live file and the identified snapshot.

BRIEF DESCRIPTION OF THE DRAWINGS

FIGS. 5 A, B, C, and D depict an example embodiment of a snapshot area and a live data system area as amended in accordance with one embodiment of the present invention.

DETAILED DESCRIPTION

Embodiments of the present invention recognize that whenever a snapshot has been created and the file has been modified, the data that exists before an update is preserved in the snapshot area. Embodiments of the present invention recognize that a snapshot version of a file will have the same data system number as the data system number of the file in the live file area. A data system number may be any nomenclature used to identify a file within a storage system, such as an inode number.

Embodiments of the present invention also recognize that whenever a file is renamed to have a new file name or moved to a different directory and the system had a file with the new file name or a file in the destination directory, the existing file is first deleted, and then the renaming takes place. The previously described process is referred to as over-writing of a file for the purposes of this application. Embodiments of the present invention recognize that if a snapshot has been created and an over-write of a file has been executed, the deleted file (e.g., the over-written file), which includes its metadata and the entire content data, is preserved in the snapshot area while the renamed file exists in the live area. The file in the snapshot area and the file in the live area have different data system numbers, and the files are not in copy-on-write relationship. In other words, when a file is renamed in a conventional data system, regardless of the level of similarity of the over-written file and the new file, the entirety of data from the over-written file is preserved in the snapshot meta area which consumes storage space.

Embodiments of the present invention recognize that some applications require a complete shadow file in order to update a file, and an application must over-write the file by renaming the shadow file. The previously described process updates a file in an atomic manner so that the file level data consistency is guaranteed. In an example, an application may be an asynchronous replication of a storage system. A replication destination system may receive the incremental data from the replication source system and update files by the atomic operation as described. Typically, snapshots are created on a replication destination system. Embodiments of the present invention recognize that as more files are updated by users on the replication source system, more incremental data is sent to the replication destination system and more files on the replication destination system are updated by the over-write operation, which results in consuming large amounts of data for the snapshot meta area.

Implementation of embodiments of the invention may take a variety of forms, and exemplary implementation details are discussed subsequently with reference to the Figures.

Figure 1:
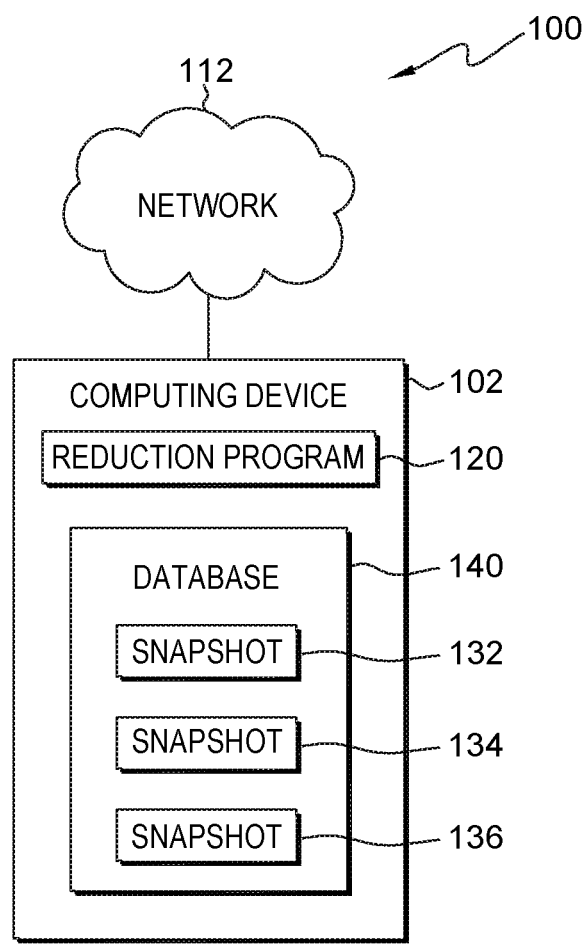
FIG. 1 is a functional block diagram illustrating a distributed data processing environment, in accordance with one embodiment of the present invention.

The present invention will now be described in detail with reference to the Figures. FIG. 1 is a functional block diagram of computing system 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted environment, computing system 100 includes computing device 102 is connected to network 112.

Network 112 may be a local area network (LAN), a wide area network (WAN), such as the Internet, a cellular data network, any combination thereof, or any combination of connections and protocols that will support communications between computing device, in accordance with embodiments of the invention. Network 112 may include wired, wireless, or fiber optic connections. Network 112 includes one or more wired and/or wireless networks that are capable of receiving and transmitting data, voice, and/or video signals, including multimedia signals that include voice, data, and video information. Computing system 100 may include other devices not shown that are able to communicate with computing device 102 via network 112.

Computing device 102 may be any computing device, such as a management server, a web server, or any other electronic device or computing system capable of processing program instructions and receiving and sending data. In some embodiments, computing device 102 may be a laptop computer, a tablet computer, a netbook computer, a personal computer (PC), a desktop computer, or any programmable electronic device connected to network 112. In other embodiments, computing device 102 may represent a server computing system utilizing multiple computers as a server system, such as in a cloud computing environment. In general, computing device 102 may be any electronic device or computing system capable of processing program instructions, sending and receiving data and communicating with network 112. In the depicted embodiment, computing device 102 contains reduction program 120 and database 140. In some embodiments, computing device 102 may include additions programs, databases, or interfaces which are not depicted. Computing device 102, reduction program 120, database 140, and/or other components, are depicted and described in further detail with respect to FIG. 4.

Reduction program 120 reduces data stored in the meta area for snapshots. In various embodiments, reduction program may have subprograms, subroutines, or other programs that work in conjunction with reduction program 120 to reduce data stored in the meta area for snapshots. In some embodiments, reduction program 120 may be located on one of the device or another device (not depicted) and reduce data stored in the meta area for snapshot in a database or data system via network 112. In various embodiments, reduction program 120 adds additional information to the live file area and the meta area, such as previous and future data structure numbers (e.g., an inode number). Reduction program 120 may then identify the difference between two files, two snapshots, a file and a snapshot, etc. and store the difference along with the additional information to the meta area for snapshots. Reduction program 120 is depicted and described in further detail in FIGS. 2, 3, 4 and 5.

In some embodiments, reduction program 120 may include a rename API enhancement that renames OLD and NEW files (renaming OLD to NEW file). In an example, a NEW file already exists, and the existing file will be deleted first and then the OLD will be renamed to NEW. If a snapshot already existed, the original NEW file can not be deleted because the snapshot needs to preserve the original NEW file. Thus, the original NEW data is preserved, hidden from the users, and is treated as snapshot metadata. Reduction program 120 will identify the original NEW file in the snapshot area as a file with the "second" data system number. In the example, reduction program 120 will identify the NEW file in the live area as the "first" file in the live area.

Database 140 may be a repository that may be written to and/or read by reduction program 120. A database is an organized collection of data. In some embodiments, reduction program 120 may store snapshots, metadata associated with snapshots, etc., and other information in database 140. In another embodiment, reduction program 120 may access snapshots and/or information associated with snapshots which are stored in database 140 by reduction program 120 or another program (not depicted). In various embodiments, other programs (not depicted) or other computing devices (not depicted) may be store information related to snapshots in database 140. In yet other embodiments, database 140 may comprise multiple databases that may be located on computing device 102, and/or other computing devices (not depicted) but connected via network 112. In other embodiments, database 140 may reside on a server, another computing device (not depicted), or independently as a stand-alone database that is capable of communicating with computing device 102 via network 112.

Snapshots 132, 134, and 136 represent a collection of snapshots located on computing device 102. A snapshot is a file containing the state of a system at a particular point in time. Typically, a snapshot will be created against a file system or a file set (a group of files with certain characteristics). A snapshot will contain files with the state of a system at a particular point in time (e.g., the snapshot created time). For example, a computing program may capture the state of a file at a particular time and store the state of the file as a backup prior to manipulation of a live file. Snapshots 132, 134, and 136 are a depicted representation of three snapshots located on computing device 102, but in some embodiments, there may be more snapshots located on computing device 102. Typically, the live file and files in each snapshot have a corresponding data system number. In some embodiments of this invention, as a result of rename operations in an environment with multiple snapshots, the live file and the files in snapshots who have different data system numbers are determined to be related.

In some embodiments, snapshots 132, 134, and 136 may be located on different computing devices (not depicted), but can communicate with reduction program 120 via network 112. In some embodiments, snapshots 132, 134, and 136 may be part of a collection of hundreds of snapshots. For example, snapshot 132, 134, and 136 represent only 3 of the many snapshots located on computing device 102.

Figure 2:
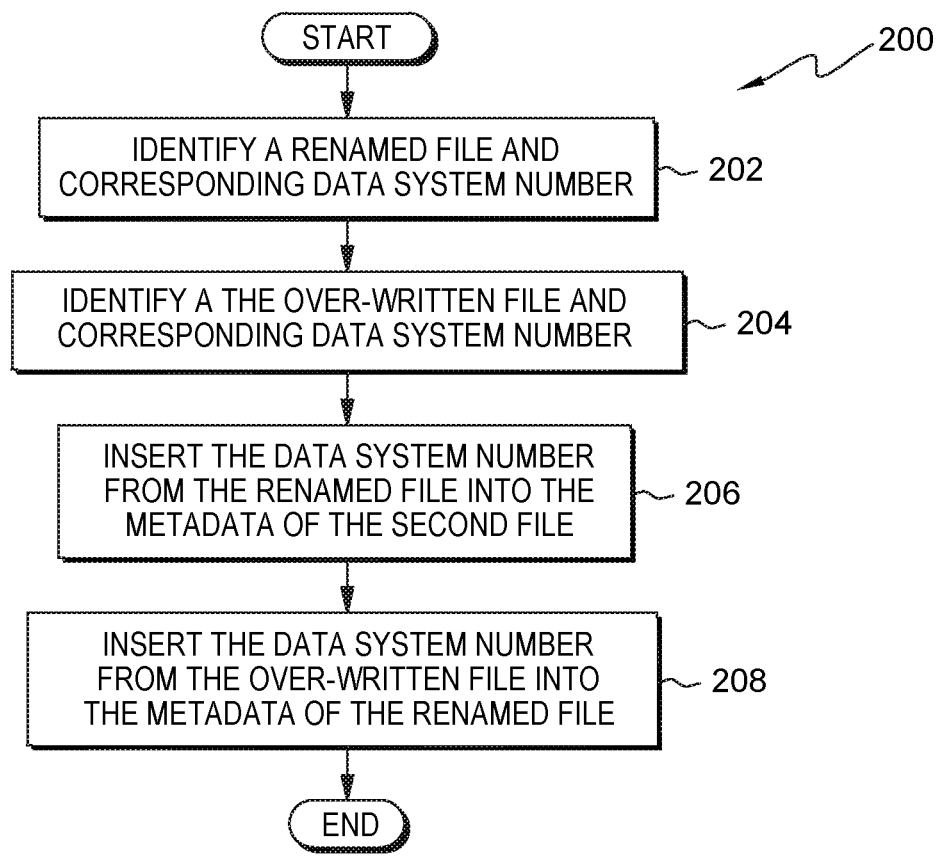
FIG. 2 depicts a flowchart depicting operational steps of a program for adjusting data system numbers of snapshots, executing within the computing system of FIG. 1, in accordance with one embodiment of the present invention.

FIG. 2 is a flowchart depicting operational steps of program 200, which is a function of reduction program 120, in accordance with an embodiment of the present invention. In some embodiments, program 200 is a sub-routine of reduction program 120 which contains enhancement of a rename( ) API for a file system. In some embodiments, program 200 begins upon renaming of a file. In some embodiments, program 200 is invoked when one or more snapshots exist in the system.

Program 200 identifies a renamed file and corresponding data system number (step 202). In some embodiments, program 200 identifies the final renamed file as the first file and identifies data system number of the final renamed file as the first data system number. In various embodiments, program 200 identifies the most recently renamed file and identifies a data system number corresponding to the most recently renamed file. In some examples, when creating a new file, the file and corresponding data system number may be assigned any number as long as the number does not already exist for another file. In other examples, when renaming a file (e.g., from fileA to fileA_renamed), the data system number does not change.

Program 200 identifies the over-written file and corresponding data system number (step 204). In some embodiments, program 200 identifies the over-written file, which is preserved in the snapshot meta area as the second file and identifies its data system number as the second data system number. In various embodiments, program 200 identifies the over-written file in the snapshot meta area as well as the corresponding data system number for the over-written file in the snapshot meta area. In an example, the data system number of a file does not change when moved to a snapshot area. The snapshot is to preserve the files and the data system number may not change. For example, program 200 identifies a data system number for a renamed file as 1001 and the data system number for the over-written file as 2001.

Program 200 inserts the data system number from the renamed file into the metadata of the second file (step 206). In some embodiments, program 200 inserts the first data system number into the metadata of the second file as the next-data system number. In other words, program 200 creates a relation between the over-written file in the snapshot area and the updated file in the live file system area. In an example, upon a rename of fileA, the final fileA in the live file system area has a current data system number of 2001. The over-written fileA which is preserved in the snapshot area has the data system number of 1001. Program 200 stores data system number 2001 as the next-data system number in the metadata of the snapshot fileA.

In some embodiments, a new field may be added to the extended attribute of the file. In an embodiment, program 200 stores null or empty if no next-data system number exist for a file. In various embodiments, program 200 creates a new field in the metadata for a file to allow for corresponding files to be stored as related. For example, program 200 inserts a next-data system number field into the metadata for a file so a next-data system number can be stored (e.g., data system number 2001 is stored as the next-data system number for the snapshot of fileA).

Program 200 inserts the data system number from the over-written file into the metadata of the renamed file (step 208). In some embodiments, program 200 inserts the second data system number into the metadata of the first file as the pre-data system number. In other words, program 200 creates a relation between the updated file in the live file system area and the over-written file in the snapshot area. In an example, upon a rename of fileA, the final fileA in the live file system area has a current data system number of 2001. The over-written fileA which is preserved in the snapshot area has the data system number of 1001. Program 200 stores data system number 1001 as the pre-data system number in the metadata of the live fileA.

In some embodiments, a new field may be added to the extended attribute of a file. In an embodiment, program 200 stores null or empty if there is no pre-data system number. In various embodiments, program 200 creates a new field in the metadata for a file to allow for corresponding files to be stored as related. For example, program 200 inserts a pre-data system number field into the metadata for a file so a pre-data system number can be stored (e.g., data system number 1001 is stored as the next-data system number for the live fileA).

Figure 4:
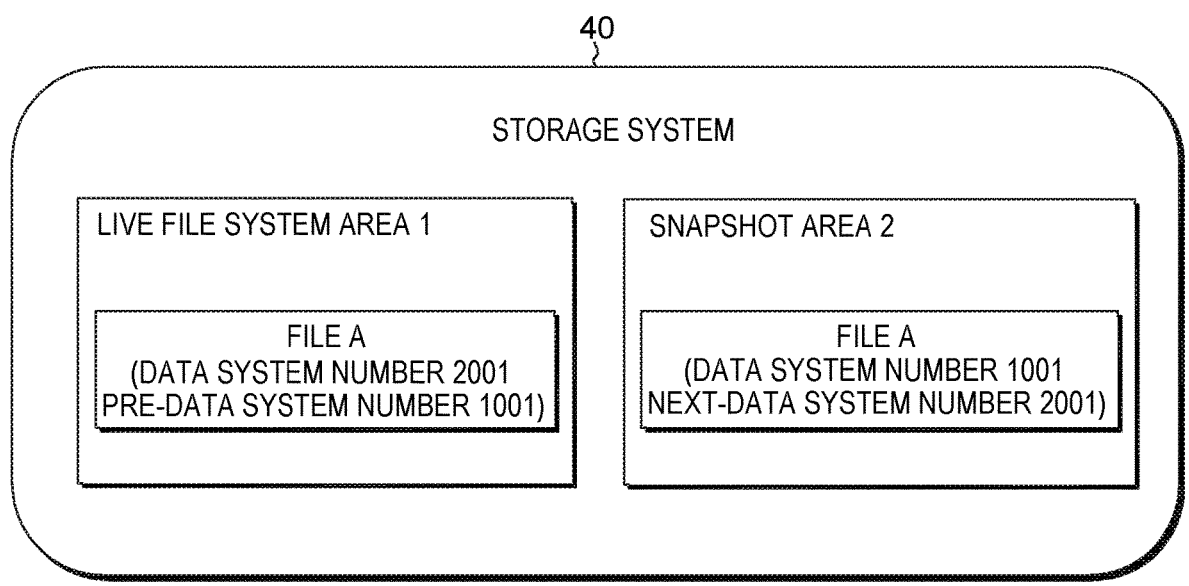
FIG. 4 depicts an example embodiment of a storage system representing a live file system and a snapshot area as amended in accordance with one embodiment of the present invention.

In a detailed example of reduction program 120, FIG. 4 depicts a storage system 40 in which reduction program 120 has performed the operational steps to adjust metadata pertaining to files. In FIG. 4, live file system area 1 contains file A. File A has metadata associated with file A, which includes data system number 2001, as well as the adjusted information of pre-data system number 1001. The pre-data system number 1001 indicates that the previous snapshot corresponding to file A has a data system number of 1001. In FIG. 4, snapshot area 2 contains file A as has metadata association with file A, which includes the data system number for the snapshot of file A, 1001, and the next-data system number for the snapshot of file A, 2001.

Figure 3:
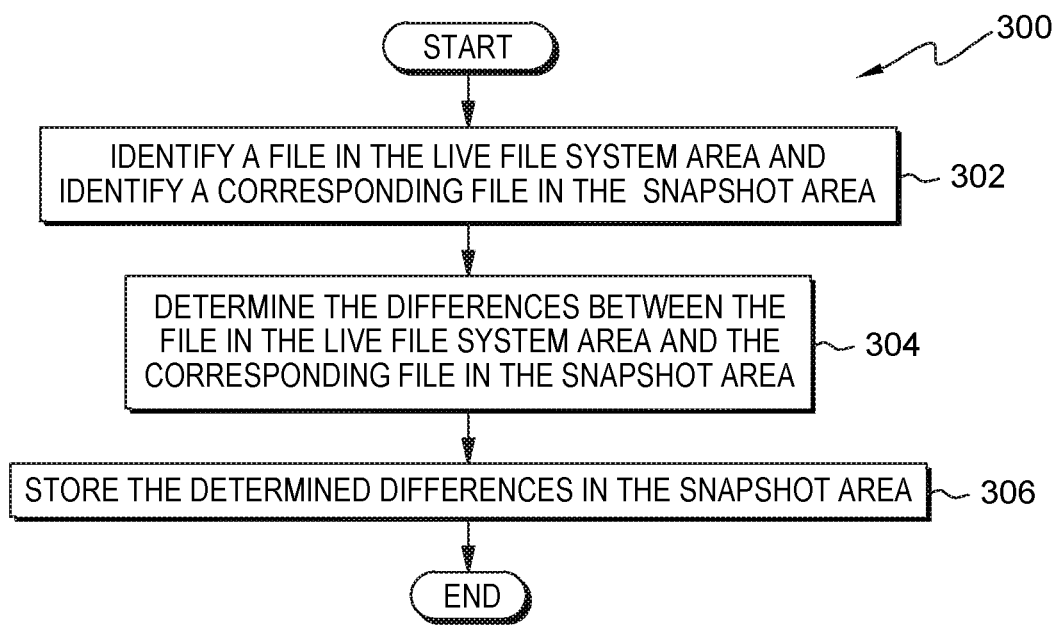
FIG. 3 is an example embodiment of a program for determining the difference between the new and old snapshots in FIG. 2, executing within the computing system of FIG. 1, in accordance with one embodiment of the present invention.

FIG. 3 is a flowchart depicting operational steps of program 300, which is a function of reduction program 120, in accordance with an embodiment of the present invention. In some embodiments, the operational steps of program 300 begin in response to a new snapshot being taken. In other embodiments, the operational steps of program 300 begin in response to the completion of program 200. In yet other embodiments, program 200 begins in response to a prompt from a user. In an embodiment, program 300 may begin when a threshold storage consumption is reached. In some embodiments, program 300 may operate in parallel with program 200.

In some embodiments, program 300 may begin based upon a de-fragmentation command. In an example, a flag can be added to the data system number, such as snap-diff-comp-flag, which indicates if program 300 has completed the steps of flowchart 300. If program 300 has finished for a given file program 300 can indicate completion by setting the flag to 1. In another example, program 300 may scan a directory tree of a snapshot and/or metadata associated with a snapshot to determine if the next-data system number exists and the flag is set to 0. Program 300 may then begin the operational step of flowchart 300.

Program 300 identifies a file in the live file system area and identifies a corresponding file in the snapshot area (step 302). In some embodiments, program 300 may identify a file in the live file system area, and identify the pre-data system number. Once, program 300 identifies the pre-data system number (e.g., pre-data system number 1001 in the metadata area of File A in FIG. 4), program 300 then searches for the corresponding file in the snapshot area (e.g., snapshot area 2 in FIG. 4). Program 300 may identify the corresponding file by searching for the data system number corresponding to the pre-data system number that was identified in the live file system area (e.g., data system number 1001 in FIG. 4). In another embodiment, program 300 may search for a next-data system number in the snapshot area that corresponds to the data system number in the live file system area. For example, program 300 search for next-data system number 2001 in snapshot area 2 in FIG. 4.

Program 300 determines the difference between the file in the live file system area and the corresponding file in the snapshot area (step 304). In some embodiments, once program 300 has identified corresponding files in the live files system area and the snapshot area, program 300 determines the difference between the two files. In some embodiments, program 300 determine if there are difference in files by checksums on the stored files. In an example, program 300 uses a checksum function on the block of data for file A in the live file system area against the block of data for file A in the snapshot area. If program 300 determines that there is no difference, program 300 may proceed to step 306. If program 300 determines that the checksum indicates that there is a difference between the two files, program 300 may compare the individual bytes of the files to determine which are different. In other embodiments, program 300 may use other methods known in the art to determine and identify the difference in corresponding files.

In some embodiments, program 300 may identify a section of sequential bytes that are different in files. Program 300 may flag the bytes for future steps. In other embodiments, program 300 may create a list or table containing the difference between corresponding bytes. In some embodiments, program 300 may determine that an entire block of data is different and flag the block of data. In other embodiments, program 300 may determine that a threshold percentage of data is different, and therefore, flag the entire block. In yet other embodiments, program 300 may determine that under a threshold percentage of data is different, and therefore, perform a byte analysis of the block of data to determine which bytes are different. Program 300 may then flag or store the different bytes.

Program 300 stores the determined differences in the snapshot area (step 306). In various embodiments, program 300 stores the determined difference in data in the snapshot area. In an example, program 300 determines a difference in a block of data for file A in snapshot area 2 and stores only the determined difference as file A in snapshot area 2 along with the metadata information, such as data system number 1001 and next-data system number 2001. In various embodiments, program 300 may determine various pieces of data are different for a specific file and store only the different pieces of the file. In an example, program 300 does not store an entire file in the snapshot area, but rather only the difference in the files. In some embodiments, program 300 may determine that no differences in the file from the live file system area and the corresponding file in the snapshot area exist. Program 300 may then just store the metadata associated with the file (e.g., the data system number and next-data system number), but no data from the actual file (e.g., file A).

In some embodiments, program 300 creates a copy-on-write relationship between two files with different data system numbers (e.g., the original file in the original file in the snapshot area and the new over-written file in the live data system area). The entire file data of the original file in the snapshot area will be freed and only the difference will be saved. Any future update to the new file in the live data system area would utilize the copy-on-write process (e.g., copying the necessary data first to the snapshot area and then executing the data update).

FIG. 4 depicts storage system 40. Storage system 40 contains live file system area 1 and snapshot area 2. Live file system area 1 is an active field where a user may modify a file. Snapshot area 2 contains copies of files from live file system area 1 before the files from life file system area 1 are modified. In various embodiments, reduction program 120 receives an indication that a user is attempting to rename a file in live file system area 1, and therefore, reduction program 120 makes a copy of the file to be modified and stores the copy in snapshot area 2. Once a file in live file system area 1 is renamed, reduction program 120 determines the difference between the two files and stores only the difference in the files in snapshot area 2. In other words, the entire modified file is located in live file system area 1, and the differences between the modified file and the copy of the file that was located in snapshot area 2 are stored in snapshot area 2. The entire copy of the file is no longer stored in snapshot area 2.

In a detailed example of reduction program 120, FIGS. 5 A, B, C, and D depict attributes of a snapshot area and a live file area. In the example embodiment described below, FIG. 5 A flows sequentially to FIG. 5 B. FIG. 5 A depicts a snapshot area and a live data system area after program 200 has added the pre-data system number and the next-data system number (i.e., the rename operation of program 200 has been completed). FIG. 5 B depicts the file from FIG. 5A after fileA has been over-written by another file (e.g., a file with data system number 3001). In other words, fileA has been renamed for a second time. In this example, the snapshot area for fileA will be updated to contain the difference in data between data system numbers 1001 and 3001, and the next-data system number is set to 3001. Snapshot fileA (data system number 1001) and the live fileA (data system number 3001) are a copy-on-write pair.

In the following example, FIG. 5 A flows to FIG. 5 C and FIG. 5 D. In FIG. 5 C another snapshot has been created. The first snapshot is referenced as snap1 and the second snapshot is referenced as snap2. In this example, program 200 has updated the pre-data system number and the next-data system numbers for the snapshot area. After the first rename, the copy-on-write relationship has been created for fileA in the live data system area to fileA (snap1) in the snapshot area. When a second snapshot has been created and fileA has been modified, the conventional copy-on-write relationship will be created between fileA in the live data system area and fileA (snap2) in the snapshot area. In this example, the data system numbers for the conventional copy-on-write relationship are the same. FIG. 5 D depicts the file from FIG. 5C, which has been over-written by another file (e.g., a file with data system number 4001). In this example, the snapshot area for fileA will be updated to contain the difference in data between data system numbers 2001 and 4001, and the next-data system number is set to 4001. Snapshot fileA (data system number 2001) and the live fileA (data system number 4001) are a copy-on-write pair. Additionally, snapshot fileA (1001) and the snapshot fileA (2001) are traceable. When fileA (snap1) is read, fileA (4001) in the live data system area, fileA (snap2) (2001), and fileA (snap1) (1001) are referenced.

Figure 6:
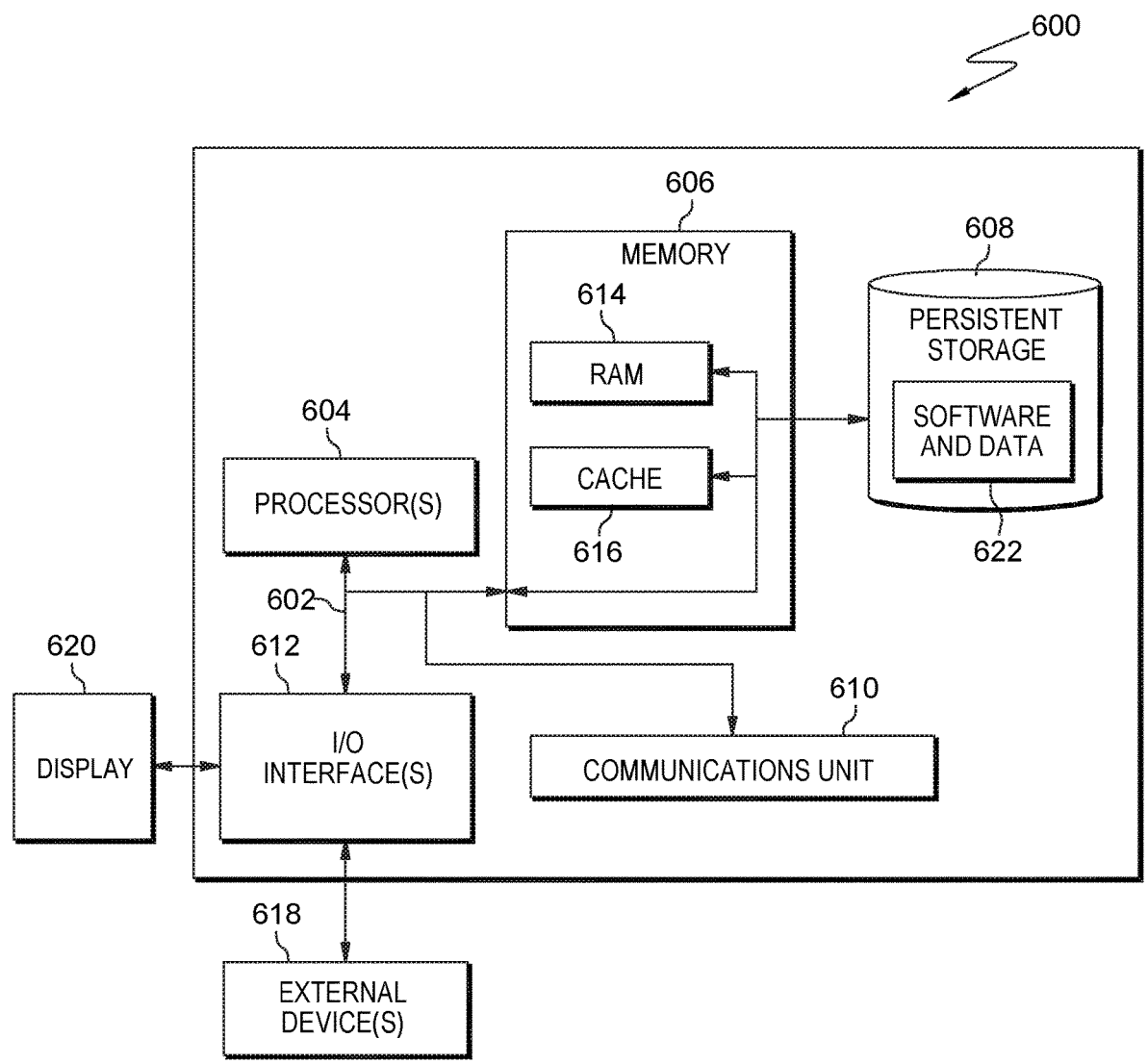
FIG. 6 depicts a block diagram of components of the server and/or the computing device of FIG. 1, in accordance with another embodiment of the present invention.

FIG. 6 depicts computer system 600, which is an example of a system that includes components of computing device 102. Computer system 600 includes processor(s) 604, cache 616, memory 606, persistent storage 608, communications unit 610, input/output (I/O) interface(s) 612, and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processor(s) 604 by holding recently accessed data, and data near recently accessed data, from memory 606.

Program instructions and data used to practice embodiments of the present invention may be stored in persistent storage 608 and in memory 606 for execution by one or more of the respective processor(s) 604 via cache 616. In an embodiment, persistent storage 608 includes a magnetic hard disk drive. Alternatively, or in addition to a magnetic hard disk drive, persistent storage 608 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface(s) 612 may provide a connection to external device(s) 618, such as a keyboard, a keypad, and/or some other suitable input device. External device(s) 618 can also include portable computer readable storage media such as, for example, thumb drives, portable optical or magnetic disks, and memory cards. Software and data used to practice embodiments of the present invention, e.g., reduction program 120 and database 140 can be stored on such portable computer readable storage media and can be loaded onto persistent storage 608 of computing device 102 via I/O interface(s) 612 of computing device 102. Software and data used to practice embodiments of the present invention, e.g., reduction program 120, can be stored on such portable computer readable storage media and can be loaded onto persistent storage 608 of computing device 102 via I/O interface(s) 612 of computing device 102. I/O interface(s) 612 also connect to display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for reducing storage space consumed by snapshots, the method comprising:
    identifying, by one or more computer processors, a live file;
    identifying, by the one or more computer processors, a snapshot that corresponds to the identified live file;
    amending, by the one or more computer processors, data corresponding to the identified live file to include tracking data for the identified snapshot;
    amending, by the one or more computer processors, data corresponding to the identified snapshot of the identified live file to include tracking data for the identified live file;
    determining, by the one or more computer processors, a value of storage consumption, wherein the value of storage consumption is a percentage of a stored data;
    in response to determining the value of the storage consumption exceeds a storage threshold and after amending the data corresponding to identified live file and identified snapshot, creating, by the one or more computer processors, a first field associated with the amended live file and creating a second field associated with the amended snapshot, wherein the first field is used for storing pre-data system number and the second field is used for storing next-data system number;
    determining, by the one or more computer processors, a difference in data between the amended live file associated with the first field and the amended snapshot associated with the second field;
    amending, by the one or more computer processors, the amended snapshot associated with the second field to include the determined difference in data between the amended live file associated with the first field and the amended snapshot associated with the second field; and
    storing, by the one or more computer processors, only the determined difference in data to replace the amended snapshot that was amended to include the determined difference in data.

2. The method of claim 1, wherein amending, by one or more computer processors, data corresponding to the identified live file to include tracking data for the identified snapshot comprises:
    adding, by one or more computer processors, metadata to the identified live file that indicates a data system number of the identified snapshot.

3. The method of claim 1, wherein amending, by one or more computer processors, data corresponding to the identified snapshot of the live file to include tracking data for the identified live file comprises:
    adding, by one or more computer processors, metadata to the identified snapshot that indicates a data system number of the identified live file.

4. The method of claim 1, further comprising:
    adding, by one or more computer processors, a flag of zero or one to the tracking data that indicates that the storage of the determined difference has completed.

5. The method of claim 1, wherein determining, by one or more computer processors, a difference in the data between the amended live file and the amended snapshot comprises:
    performing, by one or more computer processors, a checksum analysis of the amended live file and the amended snapshot to determine if there are differences in data between the amended live file and the amended snapshot; and
    in response to determining that there is a difference in data between the amended live file and the amended snapshot, performing, by or more computer processors, a byte analysis of the amended live file and the amended determine difference to determine the differences between the amended live file and the amended snapshot.

6. The method of claim 1, wherein amending, by one or more computer processors, the identified snapshot to include only the determined difference in data between the identified live file and the identified snapshot comprises:
    creating, by one or more computer processors, a copy-on-write relationship between the identified live file and the identified snapshot.

7. A computer program product for reducing the storage space consumed by snapshots, the computer program product comprising:

one or more computer readable storage media and program instructions stored on the one or more computer readable storage media, the program instructions comprising:
program instructions to identify a live file;
program instructions to identify a snapshot that corresponds to the live file;
program instructions to amend data corresponding to the identified live file to include tracking data for the identified snapshot;
program instructions to amend data corresponding to the identified snapshot of the live file to include tracking data for the identified live file;
program instructions to determine a value of storage consumption, wherein the value of storage consumption is a percentage of a stored data;
in response to determine the value of the storage consumption exceeds a storage threshold, program instructions to create and after program instructions to amend the data corresponding to identified live file and identified snapshot a first field associated with amended live file and creating a second field associated with the amended snapshot, wherein the first field is used for storing pre-data system number and the second field is used for storing next-data system number;
program instructions to determine a difference in the data between the amended live file associated with the first field and the amended snapshot associated with the second field;
program instructions to amend the amended snapshot associated with the second field to include the determined difference in data between the amended live file associated with the first field and the amended snapshot associated with the second field; and
program instructions to store only the determined difference in data to replace the amended snapshot that was amended to include the determined difference in data.

8. The computer program product of claim 7, wherein program instructions to amend data corresponding to the identified live file to include tracking data for the identified snapshot comprises program instructions to:
add metadata to the identified live file that indicates a data system number of the identified snapshot.

9. The computer program product of claim 7, wherein program instructions to amend data corresponding to the identified snapshot of the live file to include tracking data for the identified live file comprises program instructions to:
add metadata to the identified snapshot that indicates a data system number of the identified live file.

10. The computer program product of claim 7, further comprising program instructions to:
add a flag of zero or one to the amended tracking data that indicates that the storage of the determined difference has completed.

11. The computer program product of claim 7, wherein program instructions to determine a difference in the data between the amended live file and the amended snapshot comprises program instructions to:
perform a checksum analysis of the amended live file and the amended snapshot to determine if there are differences in data between the amended live file and the amended snapshot; and
in response to determining that there is a difference in data between the amended live file and the amended snapshot, program instructions to perform a byte analysis of the amended live file and the amended determine difference to determine the differences between the amended live file and the amended snapshot.

12. The computer program product of claim 7, wherein program instructions to amend the identified snapshot to include only the determined difference in data between the identified live file and the identified snapshot comprises program instructions to:
create a copy-on-write relationship between the identified live file and the identified snapshot.

13. A computer system for reducing the storage space consumed by snapshots, the computer system comprising:
one or more computer processors;
one or more computer readable storage media;
program instructions stored on the computer readable storage media for execution by at least one of the one or more computer processors, the program instructions comprising:
program instructions to identify a live file;
program instructions to identify a snapshot that corresponds to the live file;
program instructions to amend data corresponding to the identified live file to include tracking data for the identified snapshot;
program instructions to amend data corresponding to the identified snapshot of the live file to include tracking data for the identified live file;
program instructions to determine a value of storage consumption, wherein the value of storage consumption is a percentage of a stored data;
in response to determine the value of the storage consumption exceeds a storage threshold, program instructions to create and after program instructions to amend the data corresponding to identified live file and identified snapshot a first field associated with amended live file and creating a second field associated with the amended snapshot, wherein the first field is used for storing pre-data system number and the second field is used for storing next-data system number;
program instructions to determine a difference in the data between the amended live file associated with the first field and the amended snapshot associated with the second field;
program instructions to amend the amended snapshot associated with the second field to include the determined difference in data between the amended live file associated with the first field and the amended snapshot associated with the second field; and
program instructions to store only the determined difference in data to replace the amended snapshot that was amended to include the determined difference in data.

14. The computer system of claim 13, wherein program instructions to amend data corresponding to the identified live file to include tracking data for the identified snapshot comprises program instructions to:
add metadata to the identified live file that indicates a data system number of the identified snapshot.

15. The computer system of claim 13, wherein program instructions to amend data corresponding to the identified snapshot of the live file to include tracking data for the identified live file comprises program instructions to:
add metadata to the identified snapshot that indicates a data system number of the identified live file.

16. The computer system of claim 13, wherein program instructions to determine a difference in the data between the amended live file and the amended snapshot comprises program instructions to:
 perform a checksum analysis of the amended live file and the amended snapshot to determine if there are differences in data between the amended live file and the amended snapshot; and
 in response to determining that there is a difference in data between the amended live file and the amended snapshot, program instructions to perform a byte analysis of the amended live file and the amended determine difference to determine the differences between the amended live file and the amended snapshot.

17. The computer system of claim 13, wherein program instructions to amend the identified snapshot to include only the determined difference in data between the identified live file and the identified snapshot comprises program instructions to:
 create a copy-on-write relationship between the identified live file and the identified snapshot.

\* \* \* \* \*